Dec. 11, 1962 TOMIJI TARUKAWA 3,067,827
APPARATUS FOR THE AUTOMATIC WEIGHING OF A
PREDETERMINED AMOUNT OF STOCK-MATERIAL
Filed April 4, 1958 3 Sheets-Sheet 1
*Fig. 1.*
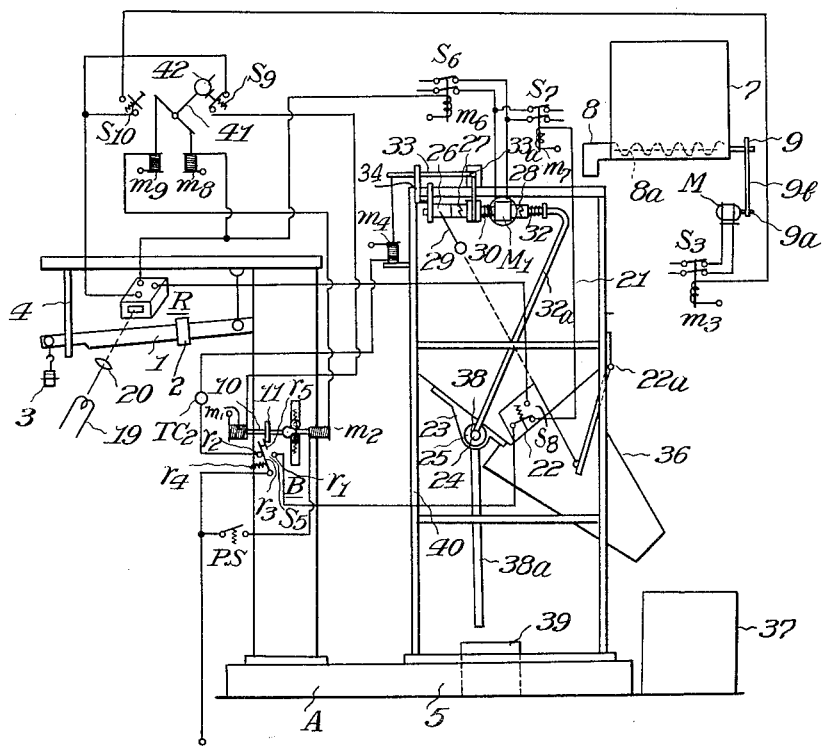
*Fig. 1A.* *Fig. 1B.* *Fig. 1C.*
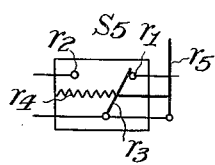 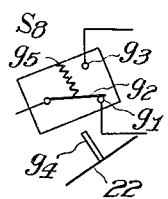 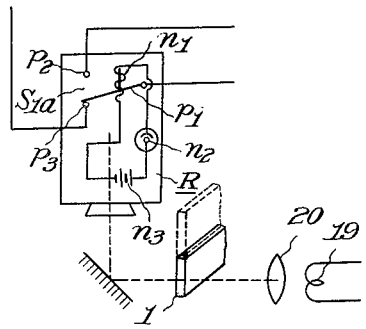

United States Patent Office 3,067,827
Patented Dec. 11, 1962

3,067,827
APPARATUS FOR THE AUTOMATIC WEIGHING OF A PREDETERMINED AMOUNT OF STOCK-MATERIAL
Tomiji Tarukawa, 5556 5-chome, Kamiitabashi-Machi, Itabashi-ku, Tokyo-to, Japan
Filed Apr. 4, 1958, Ser. No. 726,571
Claims priority, application Japan Apr. 12, 1957
2 Claims. (Cl. 177—82)

The present invention relates to an apparatus for precise weighing of a predetermined amount of any stock-material.

A main object of this invention is to provide an apparatus for precise weighing of a predetermined amount of any stock-material capable of automatically weighing the stock-material by means of an electric switch device which is opened or closed in response to the displacement of a member of the weighing device without accompaniment of any mechanical resistance against said displacement.

Another object of this invention is to provide an apparatus for precise weighing of a predetermined amount of any stock-material with said electric switch device in which the precise weighing of the stock-material is carried out by discharging an excess amount of the stock-material.

A further object of this invention is to provide an apparatus for precise weighing of a predetermined amount of any stock-material with said electric switch device, in which charging operation of the stock-material is manually started after discharge of the charged material and discharge of the charged material is automatically started upon charge of a predetermined amount of the stock-material.

A still further object of this invention is to provide an apparatus for precise weighing of a predetermined amount of any stock-material with said electric switch device, in which charging operation of the stock-material is automatically started after discharge of the charged material and discharge of the charged material is manually started after charge of a predetermined amount of the stock-material.

Said objects and other objects of this invention have been attained by an apparatus for weighing a predetermined amount of any stock-material, which comprises a weighing tank provided with an auxiliary discharge device capable of discharging an excess amount of the stock-material, a weighing device having a member which responds to changes in weight of the stock-material in the weighing tank so as to take a medium-position or an excess-position according to a predetermined amount or an excess amount of the stock-material charged in the weighing tank, an electric switch device which is opened or closed in response to the displacement said member of the weighing device to said medium or excess-position without accompaniment of any mechanical resistance against said displacement, and an electric circuit incorporating said electric switch device with said auxiliary discharge device, said electric circuit operating so as to make discharge operation of said auxiliary discharge device begin through said electric switch device in response to the displacement of said member of the weighing device to said excess-position, said discharge operation being stopped by restoration of said member of the weighing device to said medium-position through said electric switch device.

The novel features which are believed to be characteristics of the present invention are set forth with particularity in the appended claims, the present invention itself, however, both as to its construction and operation, together with further objects and advantages thereof, may best be understood by reference to the following description, taken in connection with the accompanying drawings, in which the same or similar members are indicated by the same or similar references, and in which:

FIG. 1 is a schematic view of an apparatus of this invention;

FIG. 1A is an enlarged schematic view of a switch $S_5$ used in the embodiment in FIG. 1;

FIG. 1B is an enlarged schematic view of a switch $S_8$ used in the embodiment in FIG. 1;

FIG. 1C is an enlarged schematic view of a photo-electric relay R used in the embodiment in FIG. 1;

Figure 2:
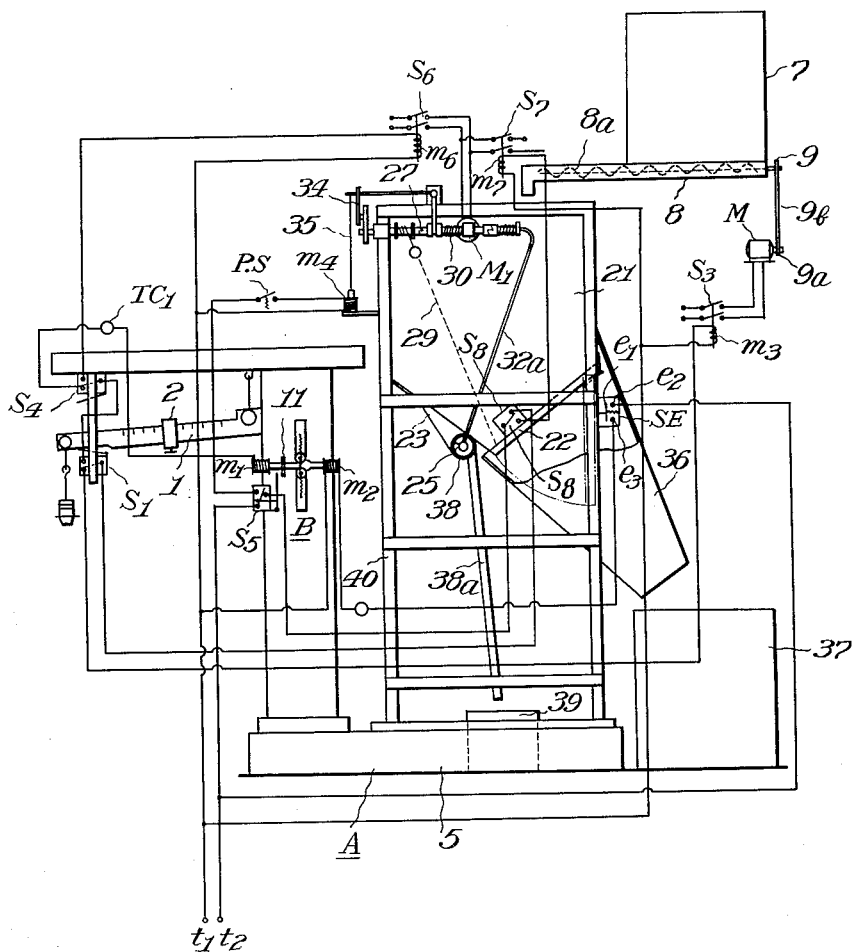
FIG. 2 is a schematic view of a modified apparatus of this invention.

Referring now to FIG. 1, a weighing tank 21 is mounted on the weighing board 5 of a weighing beam A through a turret 40. This weighing beam A is provided with a balance beam 1, an adjuster 2 hung on said beam, a supporter 4 for said beam and a balance weight holder 3. Said weighing tank is provided with a door 22 hinged thereto at 22a so as to be closed or opened by winding or opened by winding or unwinding a string 29 which is attached, at its lower end, to said door and, at its upper end, to a rotatable shaft 26. This shaft is coupled with the shaft of an electric motor $M_1$ through a clutch 27 which is always pushed by a spring 30 so as to be clutched. The clutch 27 is coupled with a crank lever 33 pivoted at a pivotal shaft 33a, said lever being attached to a moving iron core in an electromagnetic coil $m_4$ which is connected to the input terminals through a switch $S_5$ and a time switch $TC_2$ which opens the circuit of the electromagnetic coil $m_4$ with a time lag. The tank 21 is provided with a discharge conduit 38 having a cover 23 and being communicated with the interior of the tank 21. A vane wheel 25 is supported in said conduit so as to be rotated by its shaft 24 which is coupled with a rotatably supported shaft 32 through a flexible shaft 32a, said shaft 32 being coupled with the shaft of the motor $M_1$ through a clutch 28. The clutch 27 is made so as to be effective in only one rotating direction of the motor $M_1$ and the clutch 28 is made so as to be effective in only another rotating direction of said motor. The motor $M_1$ is connected to the input terminals through the parallelly connected electromagnetic switches $S_6$ and $S_7$ so that when the switch $S_6$ is closed, the shaft 32 may be driven and when the switch $S_7$ is closed, the shaft 26 may be driven. A brake means 34 is provided to hold shaft 26 against rotation except when the string 29 is being either wound or unwound.

An accumulator 7 containing any powdery stock-material to be weighed communicates with a feed pipe 8 which is provided with a screw conveyor 8a therein and arranged so that when the driving shaft of said conveyor is driven the stock-material in said accumulator may be supplied to said tank 21. The driving shaft of the screw conveyor 8a is coupled with the driving shaft of an electric motor M by means of a pulley 9 attached to the shaft of said screw conveyor 8a, a pulley 9a attached to the shaft of said electric motor M and a belt 9b hung around said pulleys.

A device B is composed of an exchange shaft 10 and a disc piece 11 on said shaft 10. The shaft 10 is provided with magnetic cores at each of its ends, each of said cores being combined with an electromagnetic coil $m_1$ or $m_2$ so as to be attracted by one or other of said coils in the case of excitation of one of said coils. When the shaft 10 is attracted to left (in the drawings, FIG. 3) by excitation of the coil $m_1$, the disc piece 11 on the shaft 10 pushes the movable contact piece $r_3$ of the switch $S_5$ against a spring $r_4$ through a lever $r_5$ so as to close a contact $r_2$, and when the shaft 10 is attracted to right by excitation of the coil $m_2$, a contact $r_1$ is closed by the spring $r_4$ as shown in FIG. 1A.

Beside the balance beam 1 is arranged a photo-electric relay R composed of a photocell $n_2$, an electric source $n_3$, a relay coil $n_1$, and a switch $S_{1a}$ so that when the balance beam 1 is in such a lowered position as shown by full line in FIG. 1C, said relay may be shut off from the light beam directed from an electric lamp 19 through a condenser lens 20 and a movable contact piece $p_1$ of the switch $S_{1a}$ may be brought in contact with a contact $p_3$, and when the balance beam 1 is in such a raised position as shown by dotted line in FIG. 1C, said light beam may be directed to said relay R and the coil $n_1$ may be excited so as to attract the contact piece $p_1$ to close the contact $p_2$.

There is provided a changing device composed of switches $S_9$ and $S_{10}$, a bell-crank 41 having a weight 42, and electromagnetic coils $m_8$ and $m_9$. In this changing device, the switch $S_9$ is closed by excitation of the coil $m_8$ and the switch $S_{10}$ is closed by excitation of the coil $m_9$.

There is also provided a switch $S_8$ which responds to the opening and closing of the door 22 of the weighing tank 21. This switch $S_8$ is composed of contacts $g_1$ and $g_3$, a movable contact piece $g_2$, and a spring $g_5$. When the door 22 is opened, the movable contact piece $S_2$ is brought in contact with the contact $g_1$ by force of the spring $g_5$, and when the door 22 is closed, the movable contact piece $g_2$ is pushed by a projection $g_4$ of the door 22 against the force of the spring $g_5$ to be brought in contact with the contact $g_3$.

The above members are connected as shown in the drawings.

The operation of the apparatus shown in FIG. 1 is as follows.

Let it be assumed that the weighing beam 1 is adjusted by a weight put on the holder 3 and by the adjuster 2 so that when a predetermined amount of the powdery stock-material is supplied into the tank 21, the balance beam 1 may be brought in balanced horizontal position. Now, when the door 22 is closed after such discharge of the stock-material in the tank 21 into a container 37 through a guide conduit 36 as will be explained hereinafter, the balance beam 1 lowers, whereby the light beam from the electric lamp 19 is shut off by the balance beam 1 as shown by full line in FIG. 1C. This causes the contact piece $p_1$ to be brought in contact with the contact $p_3$.

At the beginning of the operation of this apparatus, a push button P.S is pushed to be closed. Due to closing of the switch P.S, both the coils $m_2$ and $m_9$ are excited, the coil $m_2$ operating to bring the contact piece $r_3$ of the switch $S_5$ in contact with the contact $r_1$ by attracting the shaft 10 and the coil $m_9$ operating to close the switch $S_{10}$ by attracting the bell crank 41. Thus, a following circuit is established through a coil $m_3$ of a switch $S_3$ for the motor M.

$$m_3—S_{10}—P_3—P_1—g_3—g_2—r_1—r_3$$

By excitation of the coil $m_3$, the switch $S_3$ is closed, whereby the motor M starts and the stock-material in the accumulator 7 is supplied into the tank 21 by the operation of the screw conveyor 8a driven by said motor M through the belt 9b and pulleys 9 and 9a. Next, when the charged stock-material in the tank 21 reaches a predetermined amount, the balance beam 1 rises to its balance position and the charging of the stock-material still continues. However, when the charged stock-material in the tank 21 exceeds a precise predetermined amount in its weight, the balance beam 1 rises higher so that the balance beam 1 may allow the light beam to pass to the photoelectric relay R. Thus, the relay coil $n_1$ attracts the contact piece $P_1$ to bring it in contact with the contact $P_2$. Accordingly, the circuit through the coil $m_3$ is broken at the contact $P_3$ to stop the motor M so as to stop the charging action of the conveyor 8a. Meanwhile, a circuit is established through following points.

$$m_8—p_2—p_1—g_3—g_2—r_1—r_3$$

Thus, the switch $S_9$ is closed due to excitation of the coil $m_8$ and the switch $S_{10}$ is opened. The opening of the switch $S_{10}$ serves to secure the broken state of said circuit passing through the coil $m_3$. In this state, said circuit through the coil $m_3$ can not be completed even when the contact $P_3$ of the switch $S_{1a}$ is closed due to chattering action of the balance beam 1.

On the other hand, another circuit is established at the same time through the following points.

$$m_6—p_2—p_1—g_3—g_2—r_1—r_3$$

Thus, the coil $m_6$ is excited to close the switch $S_6$, causing the motor $M_1$ to run. As a result, the flexible shaft $32a$ is rotated through the clutch 28 and the shaft 32, whereby the vane wheel 25 is driven by said flexible shaft $32a$ to discharge the stock-material from the tank 21 into a container 39 through the conduit 38 and the pipe $38a$. This discharge of the stock-material serves for removing an excess amount of the stock material which is supplied owing to various conditions such as inertia of the driving means.

Next, upon decrease of the stock-material in the tank 21 to a precise predetermined amount, the balance beam 1 is restored to its horizontal position. Thus, the light beam is shut off by the balance beam 1, so that the contact piece $p_1$ of the switch $S_{1a}$ is brought in contact with the contact $p_3$. Accordingly, the circuit including the coil $m_6$ is broken at the contact $p_2$ to deenergize the coil $m_6$, so that the switch $S_6$ is opened so as to stop the motor $M_1$. Thus, the vane wheel 25 stops to stop the discharging action thereof. In this state, the tank 21 is charged with a precise predetermined amount of the stock-material.

Meanwhile, when the balance beam 1 takes the horizontal position, the coil $m_1$ is connected to the input terminals through the following circuit.

$$m_1—S_9—p_3—p_1—g_3—g_2—r_1—r_3$$

Accordingly, the coil $m_1$ is excited to pull the shaft 10, whereby the switch $S_5$ is exchanged by the disc 11 to bring the movable contact piece $r_3$ in contact with the contact $r_2$.

Due to the exchange of the switch $S_5$, the electro-magnetic coil $m_4$ is excited, so that it pulls the crank lever 33, whereby the clutch 27 is released and the string 29 is unwound by the weight applied on the door 22 so as to open the door 22. Upon opening of the door 22, the weighed stock-material in the tank 21 is discharged into the container 37 through the guide conduit 36.

On the other hand, a time switch $TC_2$ in the circuit of the coil $m_4$ is operated upon lapse of a suitable time lag corresponding to a time needed for the complete opening of the door 22, whereby the circuit of the coil $m_4$ is automatically opened upon said complete opening of the door 22 and the crank lever 33 is restored.

Now, when the charging operation of the stock-material into the weighing tank 21 is to be started again, it is only necessary to push the push-button P.S. That is to say, upon operation of said push-button P.S, the electromagnetic $m_2$ is excited and the shaft 10 is pulled rightward, whereby the switch $S_5$ and the time switch $TC_2$ are restored. Due to the restoration of the switch $S_5$, the coil $m_7$ is connected to the input terminals through the following points.

$$m_7—S_1—S_2—r_{1-3}$$

The excitation of the coil $m_7$ causes the switch $S_7$ to close and the motor $M_1$ to rotate in the reverse direction, whereby the shaft 26 is driven so as to wind up the string 29, causing the door 22 to close.

Upon closing of the door 22, the contact piece $g_2$ is brought in contact with the contact $g_3$ and the contact $g_1$ is opened, whereby the coil $m_7$ is opened and the motor $M_1$ is stopped. On the other hand, the coil $m_3$ is connected to the input terminals as explained hereinbefore. Thus, feeding operation of the stock-material into the weighing tank 21 commences as previously described.

The apparatus of FIG. 1 as above described relates to the case, in which the stock-material supplied in the weighing tank 21 is automatically discharged after precise weighing of a predetermined amount of the stock-material and supply of the stock-material into said tank is manually performed. However, said apparatus may be modified so that said supply may be automatically carried out after complete discharge of the stock-material from the weighing tank and said discharge may be manually performed.

Such modification can be easily obtained as shown in FIG. 2 by connecting the electromagnetic coil $m_4$ to the input terminals through a push-button P.S1 and by connecting the electromagnetic coil $m_2$ to the input terminals through such an end switch arranged so as to be closed upon complete opening of the door 22 as shown by reference letter SE. According to this modified apparatus, the shaft 10 of the device B is attracted rightward by excitation of the electromagnetic coil $m_2$ upon complete opening of the door 22, whereby the switch $S_5$ is restored and the circuit of the electromagnetic coil $m_7$ is excited through the following circuit.

$$m_7—g_1—g_2—r_1—r_3$$

By excitation of the coil $m_7$, the closing operation of the door 22 is commenced and upon the complete closing of the door 22, the contact piece $g_2$ of the switch $S_8$ is exchanged from the contact $g_1$ to the contact $g_3$, whereby the circuit of the coil $m_3$ is connected to the input terminals, and charging operation of the stock-material of a predetermined amount into the weighing tank 21 and stop of said charging operation are carried out as in the case of the apparatus in FIG. 1.

When a predetermined amount of the stock-material supplied in the weighing tank 21 is to be discharged, it is only necessary to push the push-button P.S1 inserted in the circuit of the electromagnetic coil $m_4$. The discharge operation in this case is entirely the same with that in the apparatus in FIG. 1.

In the above mentioned modified apparatus, if the electromagnetic coil $m_4$ is connected to the switch $S_5$ as in the case of the apparatus in FIG. 1, the above mentioned charging and discharging operation are automatically repeated.

Figure 3:
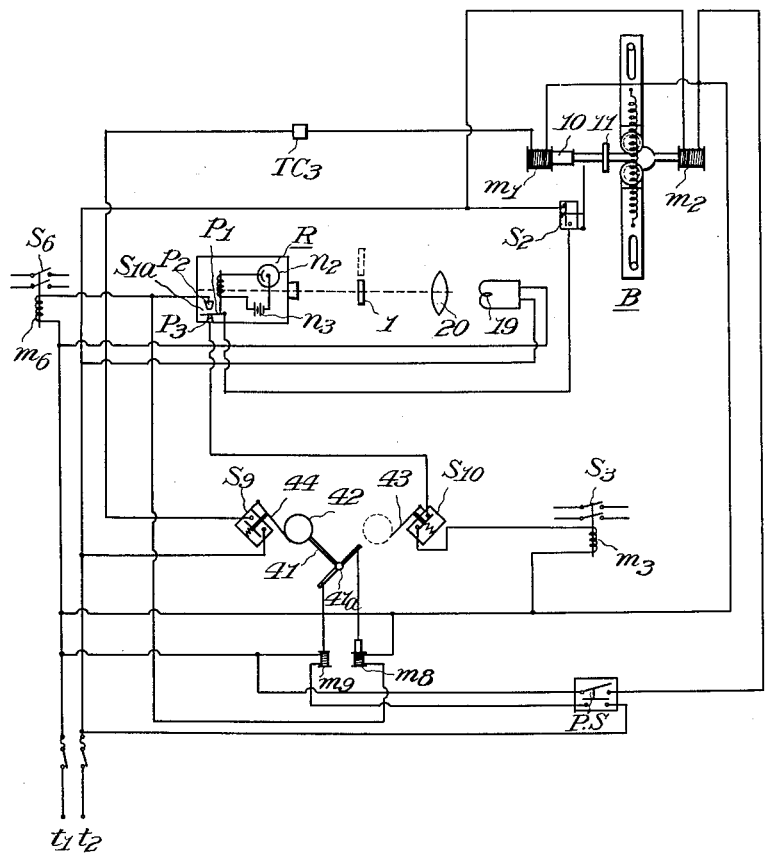
FIG. 3 is a schematic connection view of another modified apparatus of this invention.

Another embodiment is shown in FIG. 3, which shows electrical connections only. This apparatus is related to the case, in which the weighing tank is not provided with the main discharge device such as the door 22 in FIG. 1. In this case, the main discharge operation is performed, for example, by overturning the weighing tank.

The operation of the apparatus in FIG. 3 is as follows. When the weighing tank (not shown) is empty and the balance beam 1 is in such a lowered position as shown by full line in the drawing, the contact piece $p_1$ is brought in contact with the contact $p_3$, whereby the electromagnetic coil $m_3$ of the switch $S_3$ is connected to the input terminals $t_1$ and $t_2$ through the following circuit.

$$t_1—m_3—S_{10}—p_3—p_1—S_2—t_2$$

By excitation of the coil $m_3$, the switch $S_3$ is closed and the charging operation of the stock-material into the weighing tank is carried out as in the case of the apparatus in FIG. 1. Upon complete charge of the weighing tank with a predetermined amount of the stock-material, the balance beam 1 is restored to its balance position and the light beam is directed to the photoelectric relay R, whereby the contact piece $p_1$ is brought in contact with the contact $p_2$ and the contact $p_3$ is opened. By opening of the contact $p_3$, the circuit of the coil $m_3$ and the switch $S_3$ are opened and the charging operation is stopped. By closing of the contact $p_2$, the circuit of the electromagnetic coil $m_6$ of the switch $S_6$ is closed through the following circuit.

$$t_1—m_6—p_2—p_1—S_2—t_2$$

Accordingly, the excess amount of the charged stock-material is discharged as in the case of the apparatus in FIG. 1. In this case, the electromagnet $m_8$ is excited upon closing of the contact $p_2$, whereby the crank-lever 41 pivoted at a pivotal shaft 41a is turned clockwise and the switch $S_{10}$ is opened by the weight 42, so that the excitation of the coil $m_3$ is surely stopped even when chattering of the contact piece $p_1$ occurs. In this state, the electromagnet $m_1$ is excited through a time relay $TC_3$ upon the clockwise turning of the crank-lever 41 because of the closed state of the switch $S_9$, the time lag of said relay being selected so as to make excitation of the electromagnet $m_1$ delay for a time needed for the complete discharge of the excess amount of the stock-material.

By excitation of the electromagnet $m_1$, the switch $S_2$ is opened by the disc piece 11, whereby the circuit of the contact piece $p_1$ is surely opened and operations of all parts of the apparatus are stopped.

If the charged stock-material in the weighing tank is discharged, for example, by overturning the weighing tank manually, and said tank is to be charged again with the stock-material, it is only necessary to push the push-button P.S, whereby the electromagnetic coils $m_2$ and $m_9$ are excited. By excitation of the electromagnet $m_9$, the crank-lever 41 is turned counterclockwise and the switch $S_9$ is opened and the switch $S_{10}$ is closed. By excitation of the electromagnetic coil $m_2$, the shaft 10 is attracted rightward, whereby the switch $S_2$ is restored. Accordingly, the apparatus is restored to the state shown in the drawing and charging operation of the weighing tank with the stock-material is carried out again as described above.

While I have described particular embodiments of my invention, it will, of course, be understood that I do not wish my invention to be limited thereto, since many modificatons may be made and I, therefore, contemplate by the appended claims to cover all such modifications as fall within the true spirit and scope of my invention.

I claim:

1. An apparatus for precise weighing of a predetermined amount of any stock-material, comprising a weighing tank provided with a main discharge device capable of discharging the weighed stock-material, an auxiliary discharge device capable of discharging an excess amount of the stock-materail from said tank, a driving means for said auxiliary discharge device, a weighing device having a member which responds to changes in weight of the stock-material in the weighing tank so as to take a medium-position or an excess-position according to a predetermined amount or an excess amount of the stock-material charged in the weighing tank, a charging device for charging the stock-material into the weighing tank, driving means for said charging device, a first electric circuit including the driving means of said auxiliary discharge device, a second electric circuit including the driving means of said charge device, a contact inserted in the second circuit which is opened by energizing of said first circuit, and an electric switch device including said first and second circuits and capable of being exchanged from one circuit to another, electromagnetic means whereby said electric switch device is opened or closed in response to the displacement of said member of the weighing device to said medium or excess-position without accompaniment of any mechanical resistance against said displacement, said displacement of said member of the weighing device to the excess-position causing said first circuit to be energized through said electric switch device so as to make the auixiliary discharge device operate and said contact in said second circuit to be opened, and said displacement of said member of the weighing device to the medium-position due to the auxiliary discharge operation causing said first circuit to be opened through said electric switch device without accompaniment of any mechanical resistance.

2. Any apparatus for precise weighing of any stock-material, comprising a weighing tank provided with a main discharge device capable of discharging the stock-material which has been weighed, an auxiliary discharge device capable of discharging an excess amount of the stock-material out of said tank, a driving means for said auxiliary discharge device, a weighing device having a member which responds to changes in weight of the stock-material in the weighing tank so as to take a medium-position or an excess-position, respectively, according to a predetermined amount or an excess amount of the stock-material charged in the weighing tank, a charging device for charging the weighing tank with the stock-material, a driving means for said charging device, a first electric circuit including the driving means of said auxiliary discharge device, a second electric circuit including the driving means of said charging device, a contact changing means which opens a contact in the second circuit upon energizing of the first circuit, electric operating means for said contact changing means, and an electric switch which opens or closes in response to said displacement of said member of the weighing device to the medium or excess position, said displacement of said member causing said first circuit to be closed and energized through said electric switch, thereby operating means for said contact changing means so as to open the contact of said second circuit, and the displacement of said member of the weighing device to the medium-position in response to the discharge of the excess amount of the stock-material causing said switch to open the first circuit so as to stop the auxiliary discharge operation.

References Cited in the file of this patent

UNITED STATES PATENTS

| | | |
|---|---|---|
| 615,201 | Richards | Nov. 29, 1898 |
| 2,040,660 | Lenhart | May 12, 1936 |
| 2,057,380 | Keefe | Oct. 13, 1936 |
| 2,212,419 | Harmon | Aug. 20, 1940 |
| 2,451,891 | Vagim | Oct. 19, 1948 |
| 2,466,386 | Curioni | Apr. 5, 1949 |
| 2,610,726 | Howard | Sept. 16, 1952 |
| 2,776,103 | Bradley | Jan. 1, 1957 |